United States Patent [19]
Beck

[11] Patent Number: 6,116,678
[45] Date of Patent: Sep. 12, 2000

[54] LIMOUSINE SIDE STRUCTURE AND WINDOW SEALING METHOD

[75] Inventor: Gregory S. Beck, Orange County, Calif.

[73] Assignee: Krystal Koach, Inc., Brea, Calif.

[21] Appl. No.: 09/104,020

[22] Filed: Jun. 24, 1998

[51] Int. Cl.[7] .................................. B60J 1/10; B60Q 1/24
[52] U.S. Cl. ....................... 296/146.15; 296/93; 296/200; 362/503
[58] Field of Search .................................... 296/93, 96.21, 296/146.1, 146.15, 185, 191, 200, 201; 52/208; 29/401.1; 362/503, 504, 496, 485, 487

[56] References Cited

U.S. PATENT DOCUMENTS

| | | | |
|---|---|---|---|
| D. 338,430 | 8/1993 | Mardikian | 296/16 X |
| 2,654,633 | 10/1953 | Runkle et al. | 296/16 |
| 4,014,585 | 3/1977 | Earnhart | 296/16 |
| 4,405,175 | 9/1983 | Hoffman | 296/201 |
| 4,589,181 | 5/1986 | Philips | 29/401.1 |
| 5,150,943 | 9/1992 | Gold | 296/201 |
| 5,544,458 | 8/1996 | Fisher et al. | 296/93 X |
| 5,611,180 | 3/1997 | Agrawala et al. | |
| 5,809,707 | 9/1998 | Bargados et al. | 52/204.62 |
| 5,864,996 | 2/1999 | Veldman et al. | 296/93 X |
| 6,030,104 | 2/2000 | Shu | 362/486 |

*Primary Examiner*—Joseph D. Pape
*Assistant Examiner*—Paul Chenevert
*Attorney, Agent, or Firm*—Connors & Assoc.; John J. Connors

[57] ABSTRACT

A vehicle (10a) includes an elongated opening (35) defined by a frame (33) in a side (30) of the vehicle. The opening (35) receives therein a window pane (34) and a seal (40) is positioned in the space between the frame (33) and the window pane (34). The elongated opening (35) has opposed ends with side panels (38) adjacent the ends of the opening (35) and positioned so that an end portion of each panel overlies the opening. Disposed between an interior surface of opposed end portions of the window pane (34) and the end portion of the panel overlying the opening (35) is an essentially opaque material. There is at least one lamp (32) attached to the window pane (34) directly on an exterior surface of the end portions of the window pane (34) opposite the end portions of the panel (38).

16 Claims, 16 Drawing Sheets

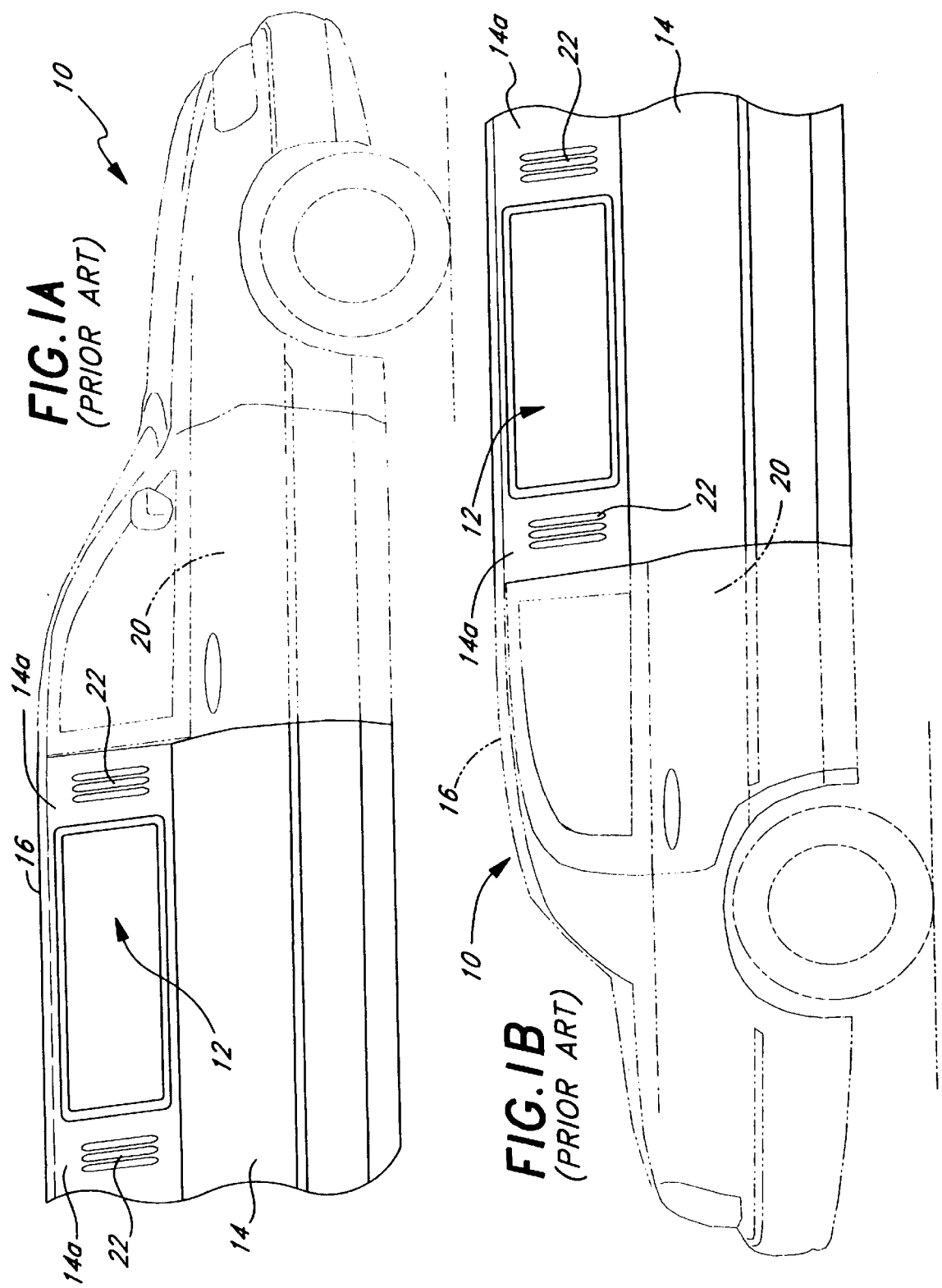

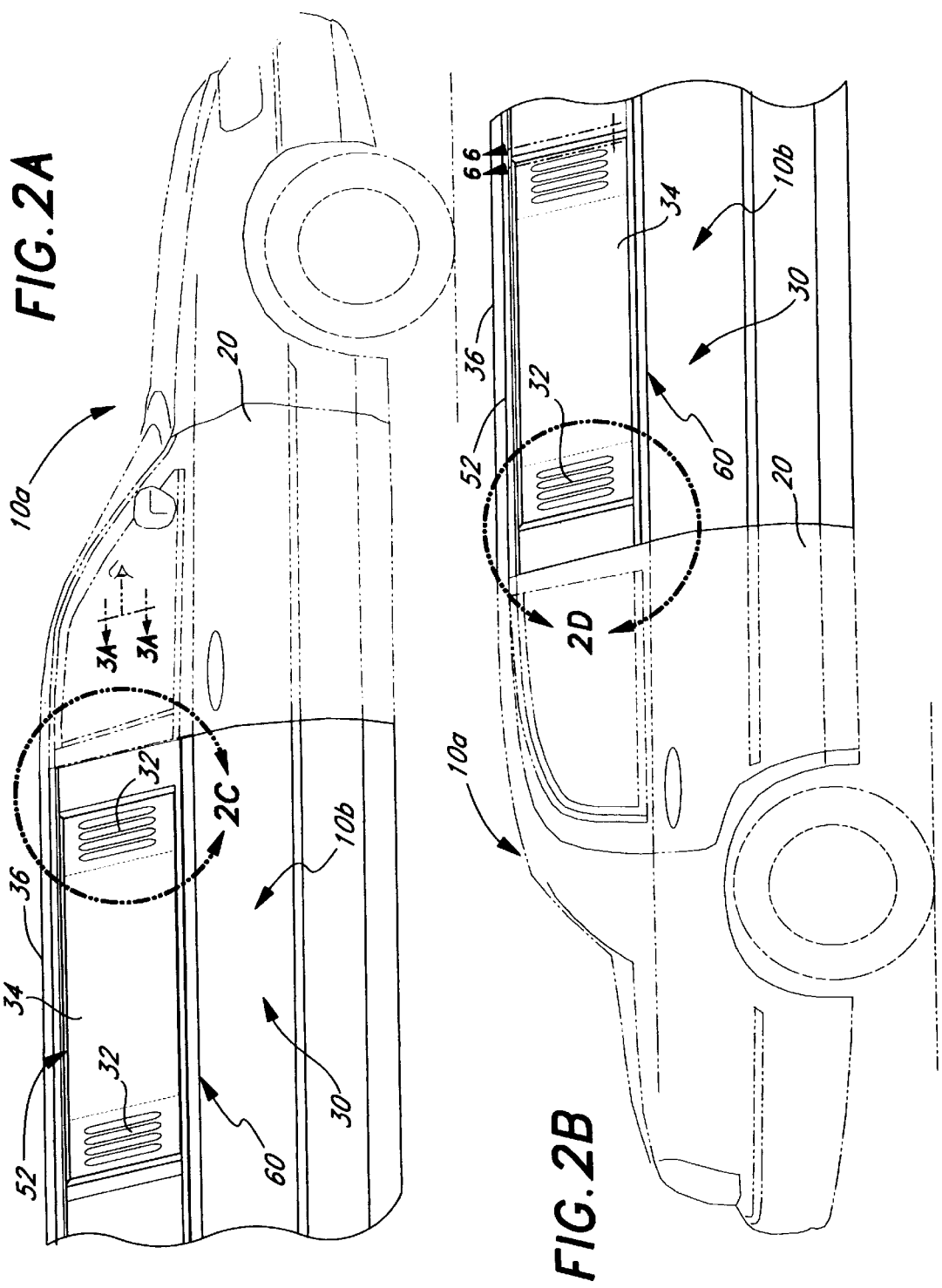

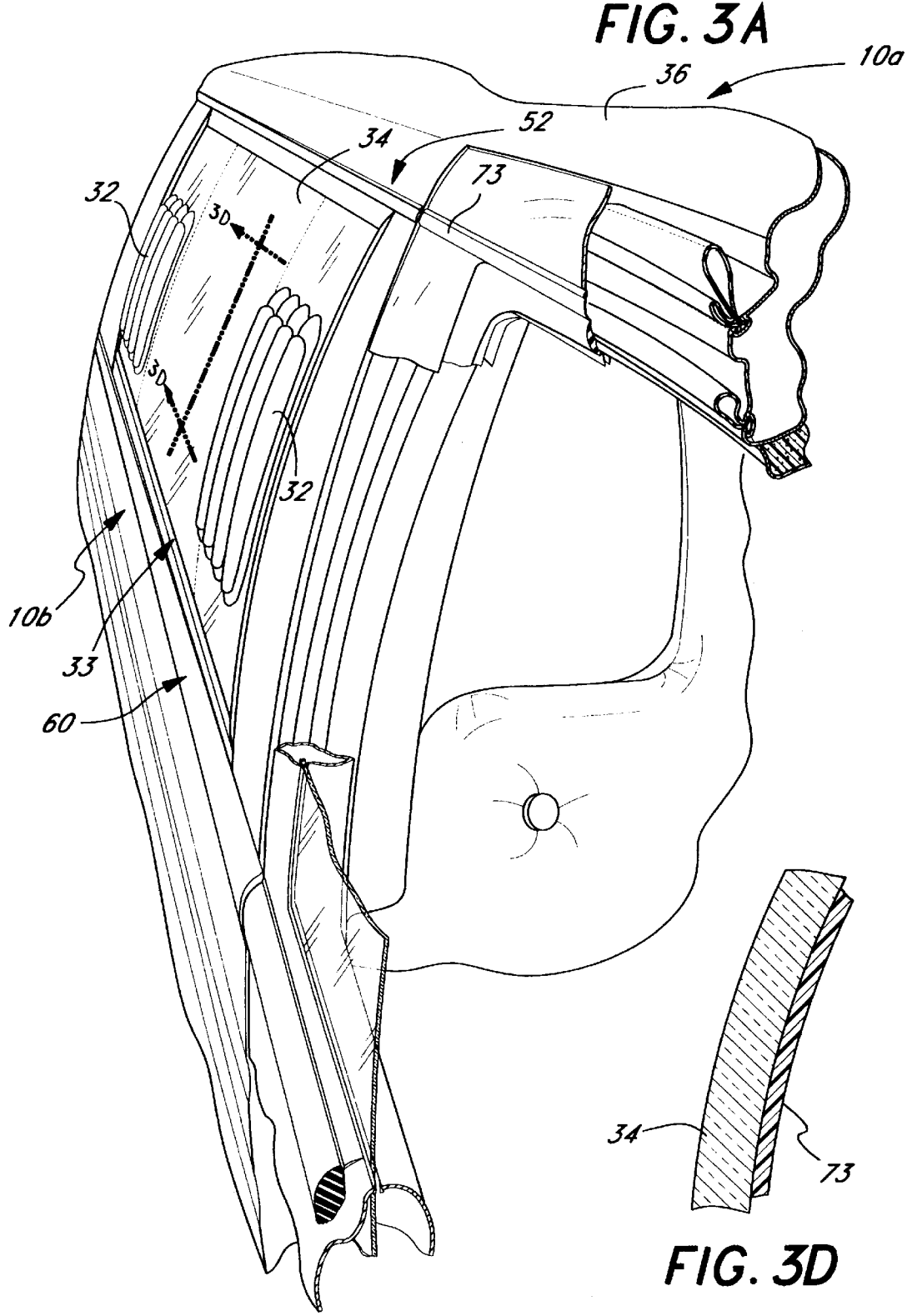

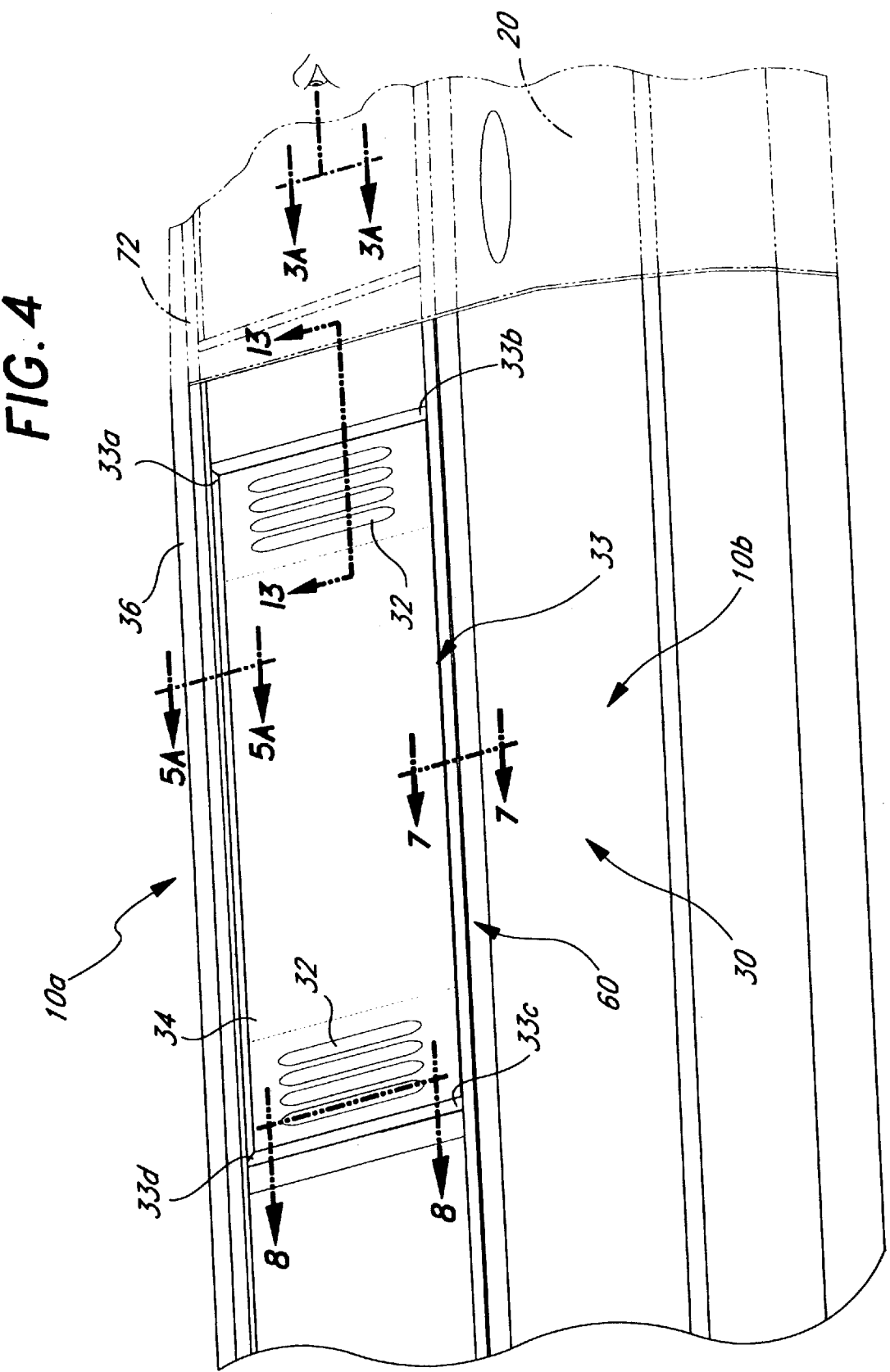

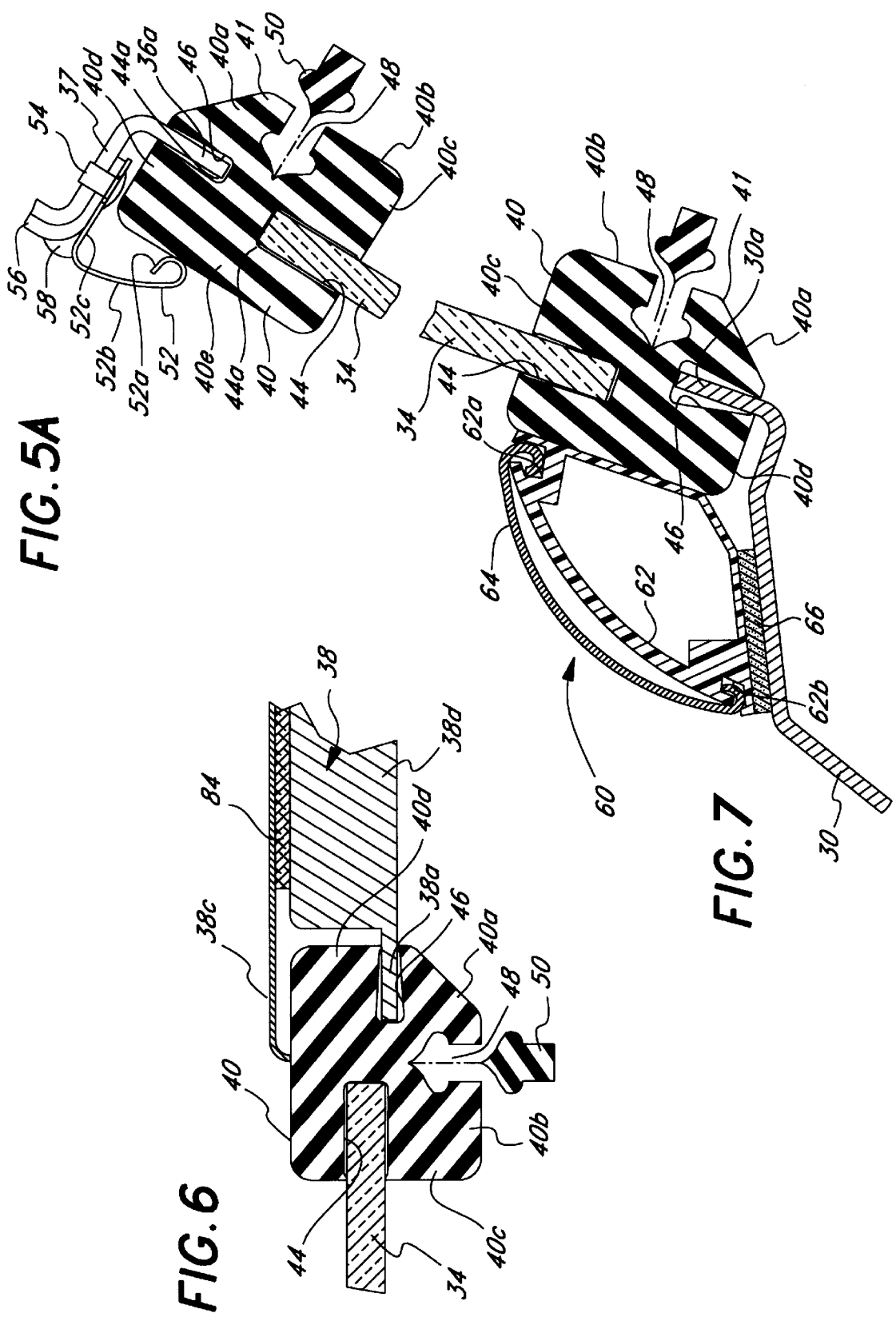

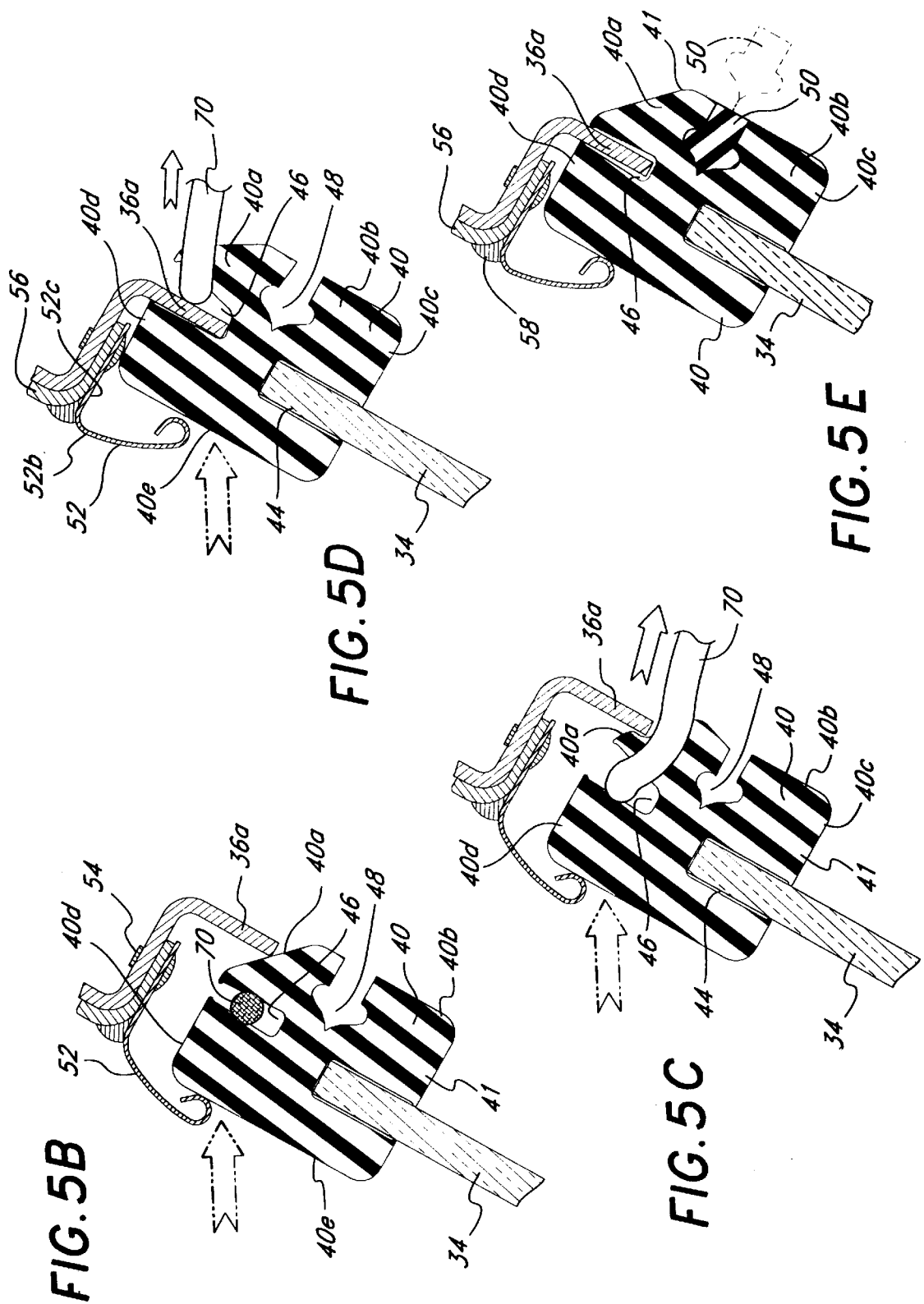

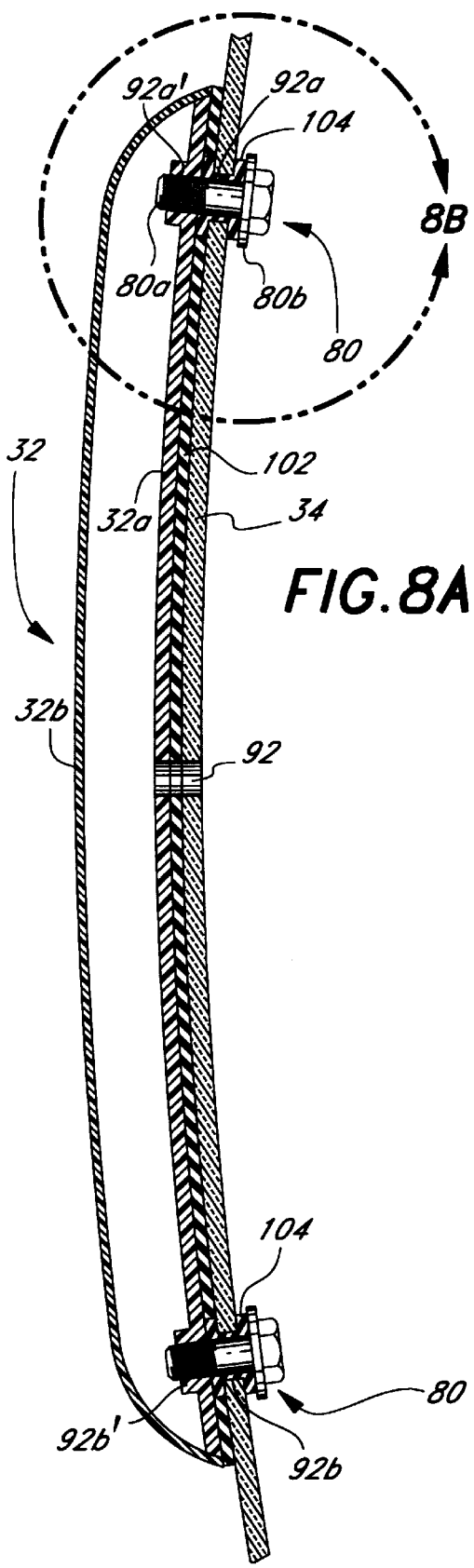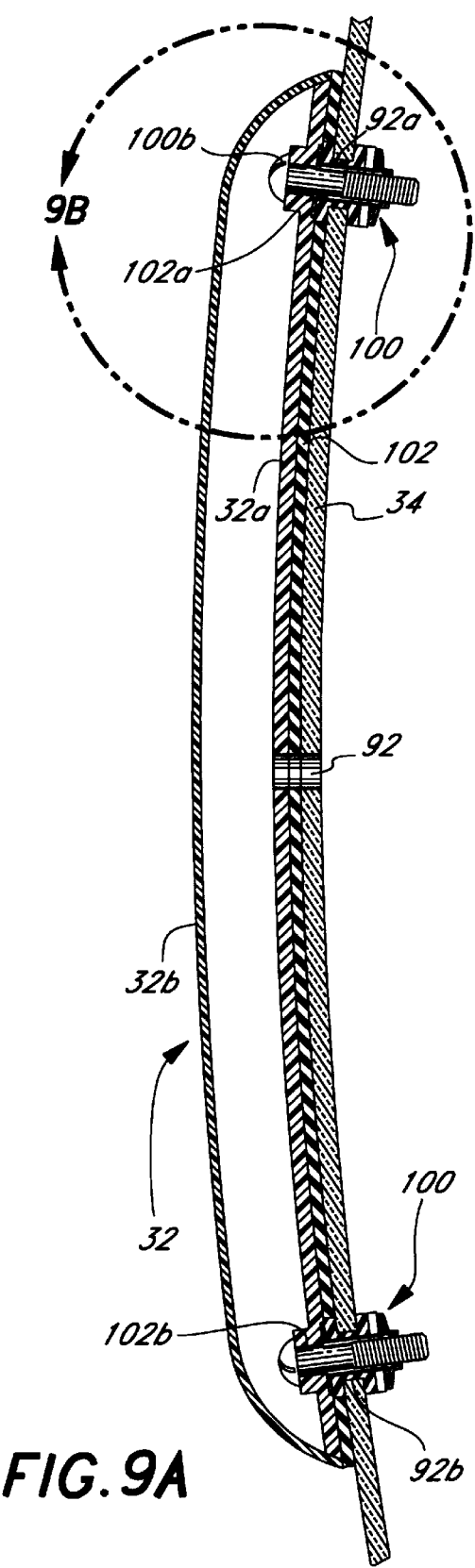
FIG.8A
FIG.9A

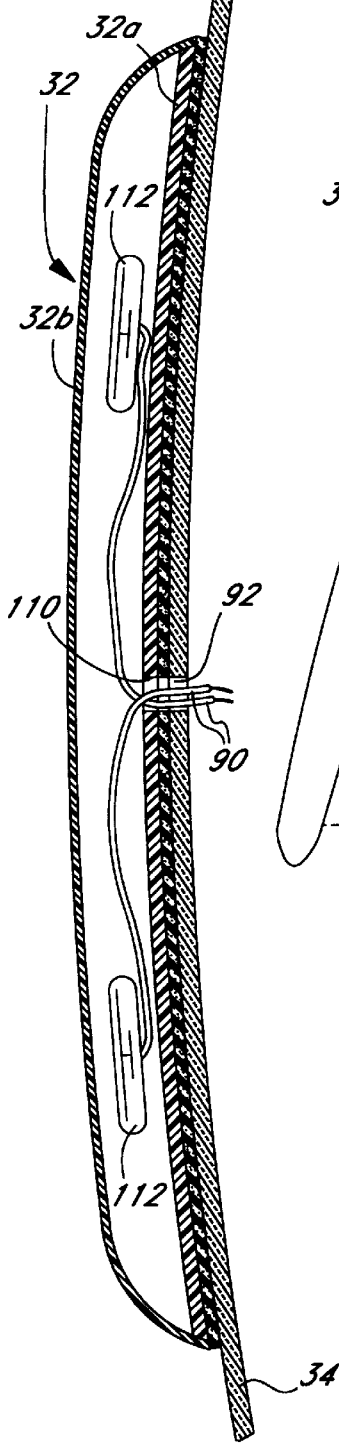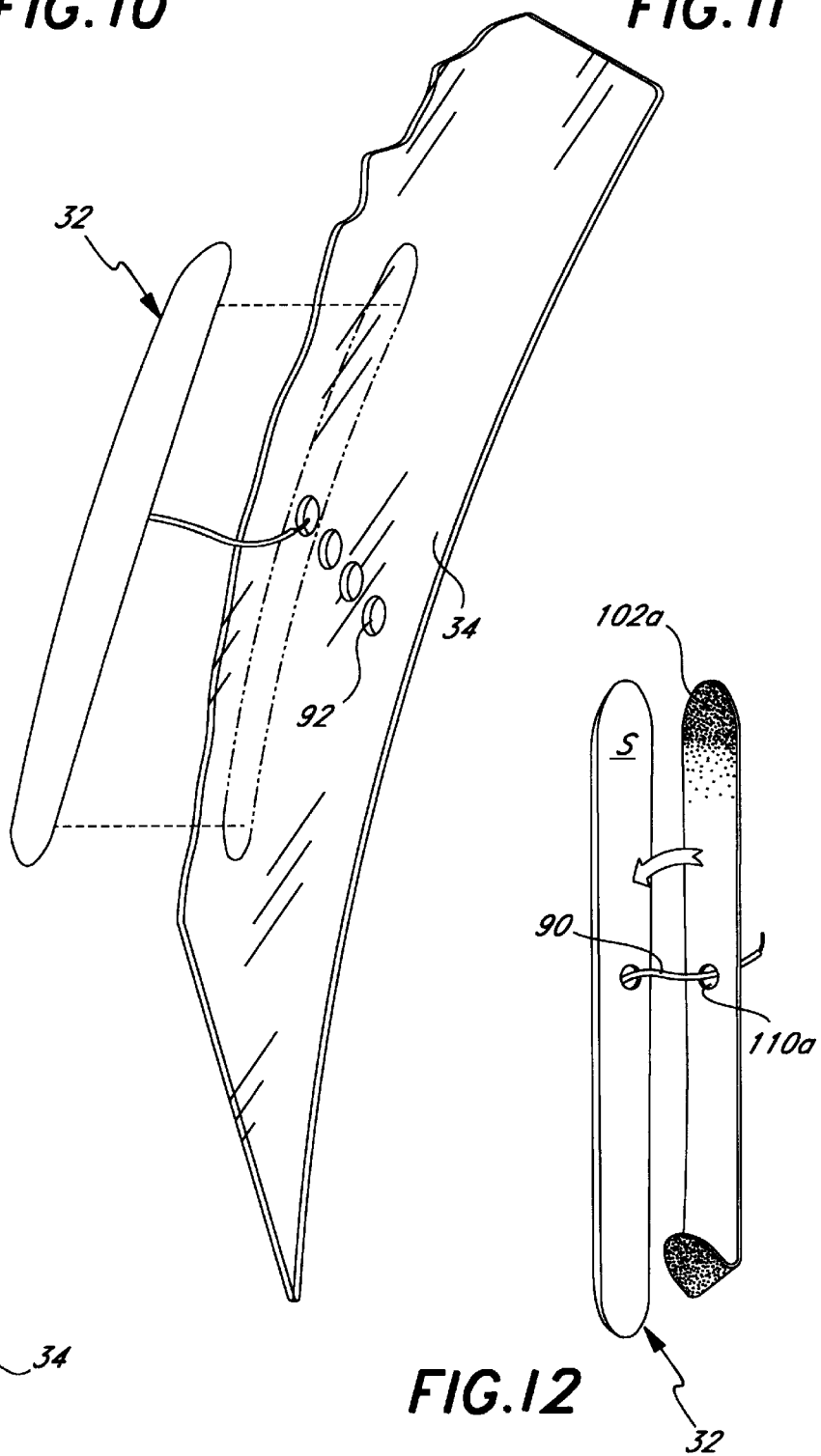
FIG. 10   FIG. 11   FIG. 12

LIMOUSINE SIDE STRUCTURE AND WINDOW SEALING METHOD

BACKGROUND OF THE INVENTION

1. Field of the Invention

This invention relates to a side of a vehicle, particularly a limousine, which has an elongated window therein and a method for sealing this window.

2. Background Discussion

Typically, limousines are manufactured by cutting in half a conventional vehicle and then building a passenger compartment between the forward and rear sections of the severed vehicle. Typically, the passenger compartment has a length ranging from 5 to 10 feet, and its sides have one or more windows therein. The windows are disposed within a frame formed by an edge portion of the roof, edges of opposed side panels, and an edge of the lower portion of the vehicle side. A seal is placed around an edge of a window pane between the window pane and the edges forming the frame, so that water or moisture will not leak into the passenger compartment. Usually lamps are mounted directly to the side panels.

SUMMARY OF THE INVENTION

It is the objective of this invention to provide a side for a vehicle, particularly a limousine, having therein an elongated window which is easy to attach to the side of the vehicle, is sealed, and has lamps mounted directly to the window pane. It is also an objective of this invention to provide an reveal molding and a belt molding respectively positioned above and below the window and aligned with reveal and belt moldings on the forward and rear sections of the vehicle.

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include an improved seal which is easy to install, lamps conveniently mounted directly to the window pane, and easy to install reveal and belt molding on the side of the vehicle above and below the window which are aligned with reveal and belt molding on the forward and rear sections of the vehicle.

The first feature of the vehicle side of this invention is that the side includes an elongated opening which receives therein a window pane, the end portions of the window pane being blocked by an essentially opaque material. The elongated opening has opposed ends with an internal panel adjacent at least one end and positioned so that a portion of the panel overlies the opening. The opaque material is disposed between at least the end portion of an interior surface of the window pane and the portion of the panel overlying the opening. In one embodiment of this invention, the window pane has edges defining a substantially rhomboid configuration and the elongated opening has a shape substantially the same as this window pane.

The second feature is that there is at least one lamp attached to the window pane on an exterior surface portion of the window pane opposite the panel. As will be apparent from the subsequent discussion, the opaque material prevents someone on the exterior of the vehicle from seeing what is behind the end portion of the window pane. Thus, the end portion of the panel and any wiring for the lamp is hidden from view. There are several ways to mount the lamp directly to the window pane. In one embodiment, at least two spaced apart holes in the window pane in the portion of the window pane opposite the panel are used to retain fasteners. One fastener extends through each of the holes and is connected to the lamp to secure the lamp to the window pane. Preferably, a grommet member is positioned within each of the holes and surrounds each of the fasteners. The fasteners may be attached so that they are accessed from the exterior of the vehicle or from the passenger compartment of the vehicle. When accessing the fastener from the exterior of the vehicle, the lamp comprises a lens detachably mounted to a base which is secured to the exterior surface portion of the window pane by a fastener which is accessed upon detaching the lens to allow the fastener to be disconnected for removal of the lamp from the window pane. In another embodiment, a gasket is disposed between an underside of the lamp and the exterior surface portion of the window pane. This gasket has one side bonded by an adhesive to the underside of the lamp and another side which is bonded by an adhesive to the exterior surface portion of the window pane.

The third feature is a seal positioned in a space between the frame and the edge of the window pane. The seal includes an elongated, flexible, resilient leg segment at least partially surrounding the window pane seated in the opening. This leg segment has a substantially rectangular cross-sectional configuration, an inside surface, an outside surface, a frame surface, and a window pane surface. There is a locking groove along the inside surface of the leg segment which receives a locking strip that is inserted into the locking groove. A frame groove along the frame surface receives an edge of a portion of the window frame, and a window pane groove along the window pane surface receives an edge of a portion of the window pane. There is a biased corner between the frame surface and the inside surface which is at an angle of from about 30 to about 60 degrees with respect to the inside surface. The frame defines corners of the opening and each corner forms an angle having two legs corresponding to adjacent sides of the opening. The seal comprises at least two leg segments and a corner piece which fits within the angle of the corner with the leg segments being attached to the corner piece during an insert molding process, so that each leg segment is aligned with one leg of the angle and bonded to the corner piece.

The fourth feature is molding above and below the installed window pane which are aligned with molding in doors in the forward and rear sections of the vehicle. There is a lower body vehicle side wall positioned below the window pane, and the window pane has a window molding strip along its sealed edge adjacent the lower body side wall. There is door along side the window pane and this door has a substantially horizontal door molding strip along an intermediate exterior portion of the door. The window molding strip along the sealed edge of the window pane is horizontally aligned with the door molding strip. There is a top wall positioned above the installed window pane, and along the sealed edges of the window pane there is a window molding strip adjacent the top wall. Along side the window pane is a door with a substantially horizontal door molding strip along an upper exterior portion of the door. The window molding strip along the sealed edge of the window pane is horizontally aligned with this upper door molding strip. Preferably, both the window molding strip each have an exterior substantially similar in appearance to the appearance of the door molding strips to which they are aligned.

This invention also includes a method of mounting a window pane to a frame of a window in a vehicle. This method includes:

(a) providing an elongated, flexible, resilient leg segment having a substantially rectangular cross-sectional configuration, an inside surface, an outside surface, a frame surface, and a window pane surface, a locking groove along the inside surface adapted to receive a locking strip that is inserted into the locking groove, a frame groove along the frame surface adapted to receive an edge of a portion of a window frame, a window pane groove along the window pane surface adapted to receive an edge of a portion the window pane, and a biased corner between the frame surface and the inside surface which is at an angle of from 30 to 60 degrees with respect to the inside surface, (b) inserting lengthwise into the frame groove a flexible cord-like member prior to insertion of the edge of a portion of the window frame, (c) inserting the edge of a portion the window pane into the window pane groove, (d) placing the edge of the portion of the window frame to be inserted into the frame groove in contact with the biased corner and then, while simultaneously pulling the cord-like member from the groove to bend the biased corner outward expanding the frame groove, pushing the edge of the portion of the window frame being inserted into the frame groove with the cord-like member being pulled from the frame groove, and (e) inserting a locking s trip in the locking groove.

BRIEF DESCRIPTION OF THE DRAWING

The preferred embodiments of this invention, illustrating all its features, will now be discussed in detail. These embodiments depict the novel and non-obvious side structure of a vehicle of this invention an d method of mounting the window and moldings as shown in the accompanying drawing, which is for illustrative purposes only. This drawing includes the following figures (FIGS.), with like numerals indicating like parts:

FIGS. 1A and FIG. 1B are side elevational views of a conventional limousine.

FIGS. 2A and 2B are side elevational views of a limousine having a side embodying the features of this invention.

FIG. 3A is a perspective view as seen when viewed looking along line 3A—3A of FIG. 2A.

FIG. 3D is a cross-sectional view taken along line 3D—3D of FIG. 3A.

FIG. 4 is a fragmentary view showing a portion of the side of the limousine shown in FIGS. 2A and 2B.

FIG. 5A is a cross-sectional view taken along line 5A—5A of FIG. 4, showing the roof edge portion of the window frame inserted into the seal, with the reveal molding disposed along the side of the limousine between the top of the roof and window, with the seal of this invention holding the roof edge portion and window pane in grooves in the seal and a locking strip positioned to be inserted into a spade shaped groove in the inside surface of the seal.

FIGS. 5B through 5E are cross-sectional views similar to that shown in FIG. 5A, showing the method by which the seal is attached to the window pane and frame.

FIG. 6 is a cross-sectional view taken along line 6—6 of FIG. 2B, showing the side panel structure forming a side portion of the window frame that is inserted into the seal.

FIG. 7 is a cross-sectional view taken along line 7—7 of FIG. 4, showing the side of the limousine forming a lower portion of the window frame that is inserted into the seal, with the belt molding disposed along the side of the limousine below the window.

FIG. 8A is a cross-sectional view of one embodiment for mounting the lamps directly to the window pane.

FIG. 9A is a cross-sectional view showing a second way of mounting the lamp directly to the window pane.

FIG. 10 is a cross-sectional view showing a third way of mounting a lamp directly to the window pane.

FIG. 11 is an exploded view of the lamp shown in FIG. 10, being attached to the window pane.

FIG. 12 is a perspective view showing the underside of the lamp depicted in FIGS. 10 and 11.

FIG. 16A is a plan view depicting the overall configuration of one embodiment of the seal used in this invention.

FIG. 16B is a plan view depicting the overall configuration of an alternate embodiment of the seal shown in FIG. 16A.

DETAILED DESCRIPTION OF THE PREFERRED EMBODIMENTS

Figure 2C:
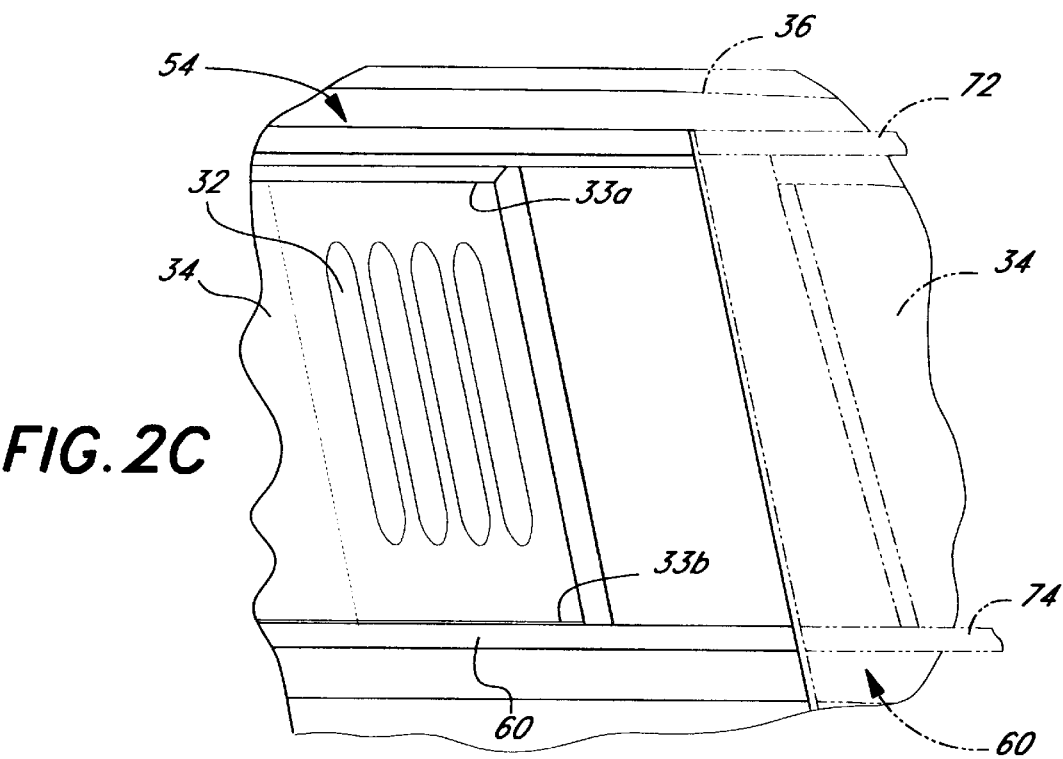
FIG. 2C is an enlarged fragmentary view of the forward window portion taken along line 2C of FIG. 2A.

A conventional limousine 10 is illustrated in FIGS. 1A and 1B where windows 12 in the side wall 14 of the limousine are positioned next to each other with a portion 14a of the side wall extending up to the roof 16. In the side wall portions 14a between the windows 12 and between the windows and doors 20 are lamps 22 which are attached to the structure forming the side wall portions 14a. It is difficult to attach the lamps 22 to the side wall portions 14a, and from an aesthetic point of view, it is more desirable to have these lamps mounted directly to the windows 12.

In accordance with this invention, as depicted in FIGS. 2A and 2B, a side 30 of a passenger compartment 10b of a limousine 10a embodying this invention is illustrated where lamps 32 are mounted directly to a window pane 34. As best shown in FIGS. 3A through 3C, the window pane 34 is received in a frame 33 defining an elongated opening 35 (FIG. 3C) in the upper portion of the side 30. The edge 36a (FIG. 5A) of the roof 36 of the limousine 10a forms an upper portion of the frame 33. The edge 30a of the upper portion of the side 30 (FIG. 7) forms the lower portion of the frame 33, and opposed edges 38a (FIG. 6) of a pair of opposed sail panel structures 38 form the opposed sides of the frame 33. As an optional feature shown in FIG. 3D, the inside central surface portion of the window pane 34 may be covered with a film 73 of tinting material which essentially prevents a person outside the passenger compartment 10b from viewing into the passenger compartment 10b, but allows passengers in the passenger compartment to look through the window pane.

The shape of the frame 33 may be any configuration, so long as it conforms essentially to the shape of the window pane 34, which is typically a parallelogram, rectangle, or rhomboid. The window pane 34 is slightly smaller than the frame 33, and it has a seal 40 along its perimeter which serves a dual purpose as the means for sealing the space between the installed window pane 34 and the frame 33, and the means for attaching the window pane to the frame. Preferably, the corners 33a through 33d (FIG. 4) of the frame 33 are formed as angles with adjacent sides of the frame at each corner, each forming one leg of the angle.

As illustrated in FIGS. 16A and 16B, the seal 40 may be in the form of a closed loop (FIG. 16A) or a pair of U-shaped members (FIG. 16B). This seal 40 comprises legs 41 connected between corner pieces 42 which fit into each corner 33a through 33d of the frame 33. The closed loop seal 40 shown in FIG. 16A has a circumference slightly less than the perimeter of the window window pane 34 and it is stretched like a rubber band around the perimeter of the window pane during installation in the frame 33. The other embodiment shown in FIG. 16B comprises a pair of U-shaped elements M and N, which are each individually positioned around the perimeter of the window pane 34 during installation in the frame 33. When the shaped elements M and N are positioned on the perimeter of the window pane 34, the free ends 120 and 122, respectively on the legs 41 of the U-shaped elements, abut each other and are bonded together with an adhesive.

As best depicted in FIGS. 5A through 5E, 6, and 7, each leg is an elongated, elastic, resilient member made of, for example, rubber. The legs 41 are disposed along the perimeter of the window pane 34 and fit snug in the space between the perimeter of the window pane and the frame 33 when the window pane is installed in the opening 35. The legs are connected to the corner pieces so that there is no leakage at the point of connection. This seal 40 has a generally rectangular cross section with one corner 40a cut away at a bias, forming an angle in the illustrated example of 45 degrees with the inside surface 40b of the seal.

The window pane side 40c of the seal 40 includes a groove 44 having a width approximately equal to the thickness of the window pane 34, typically, from about ⅛ to about ¼ inch. This groove 44 has a generally flat bottom 44a and a depth of from about ¼ to about ½ inch. The frame side 40d includes a groove 46 having a width approximately equal to the thickness of the frame portion (the edge 36a in FIG. 5A, or the edge 38a in FIG. 6, or the edge 30a in FIG. 7 ), typically, from about 1/16 to about ⅛ inch. The grooves 44 and 46 each have a generally flat bottom 44a and a depth of from about ⅛ to about ½ inch. There is a groove 48 on the inside surface 40b which has a bottom portion with a generally spade-like cross section that corresponds to the spade-like cross section of a locking strip 50 which is forced into this spade shaped groove 48, after the frame 33 and window pane 34 are, respectively, inserted into the grooves 44 and 46. The spade shaped groove 48 has a width at its widest portion typically from about ¼ to about ⅜ inch and a depth of from about ¼ to about ½ inch.

As shown in FIG. 5A, the groove 46 in the frame side 40d of the seal 40 has a width which is equal to the thickness of the roof wall structure 37 forming the upper portion of the frame 33. An upper reveal molding 52 is fastened by a rivet 54 to this roof wall structure 37. The reveal molding 52 has a generally L cross-sectional shape with a curled up, inverted lip 52a at the end of the one leg 52b. This one leg 52b is spring biased against the exterior surface 40e of the seal 40. Fitted snug between a vinyl top cover sheet 56 and the other leg 52c of the reveal molding 52 is a plastic trim piece 58.

As illustrated in FIG. 7, the edge 30a of the upper portion of the side 30 forms the lower portion of the frame 33. This edge 30a is inserted into the one groove 46, with the lower edge of the window pane 34 inserted into the opposite groove 44. A belt molding 60 is mounted along the lower portion of the window. It comprises a plastic body member 62 having opposed slots 62a and 62b which receive curled ends of a metallic strip 64 positioned on the exterior of the body member. A two-sided adhesive tape 66 fastens a portion of the body member to the exterior surface of the side 30 of the limousine 10a.

Figure 14:
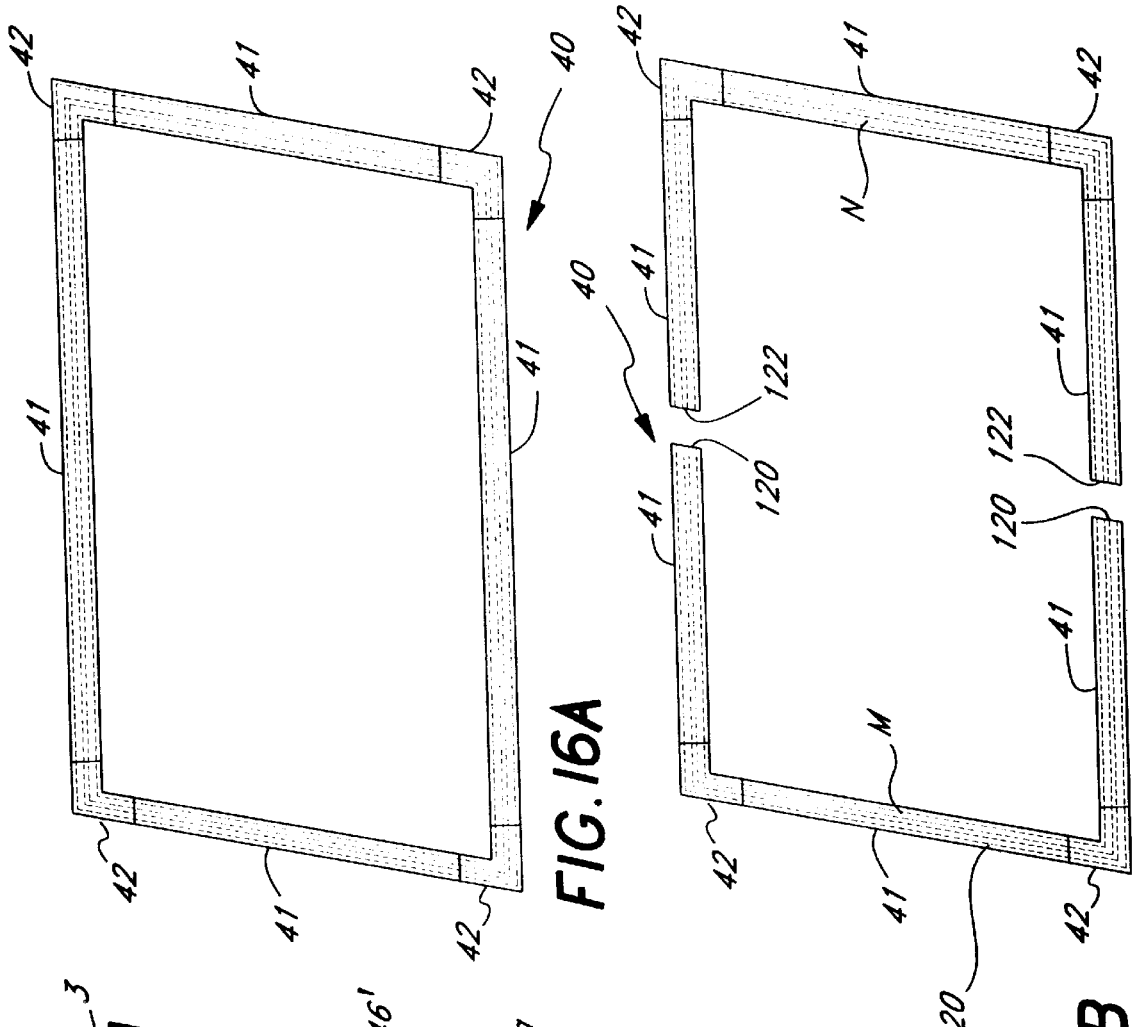
FIG. 14 is a plan view showing a mold for a corner piece of the seal for the window.
Figure 15:
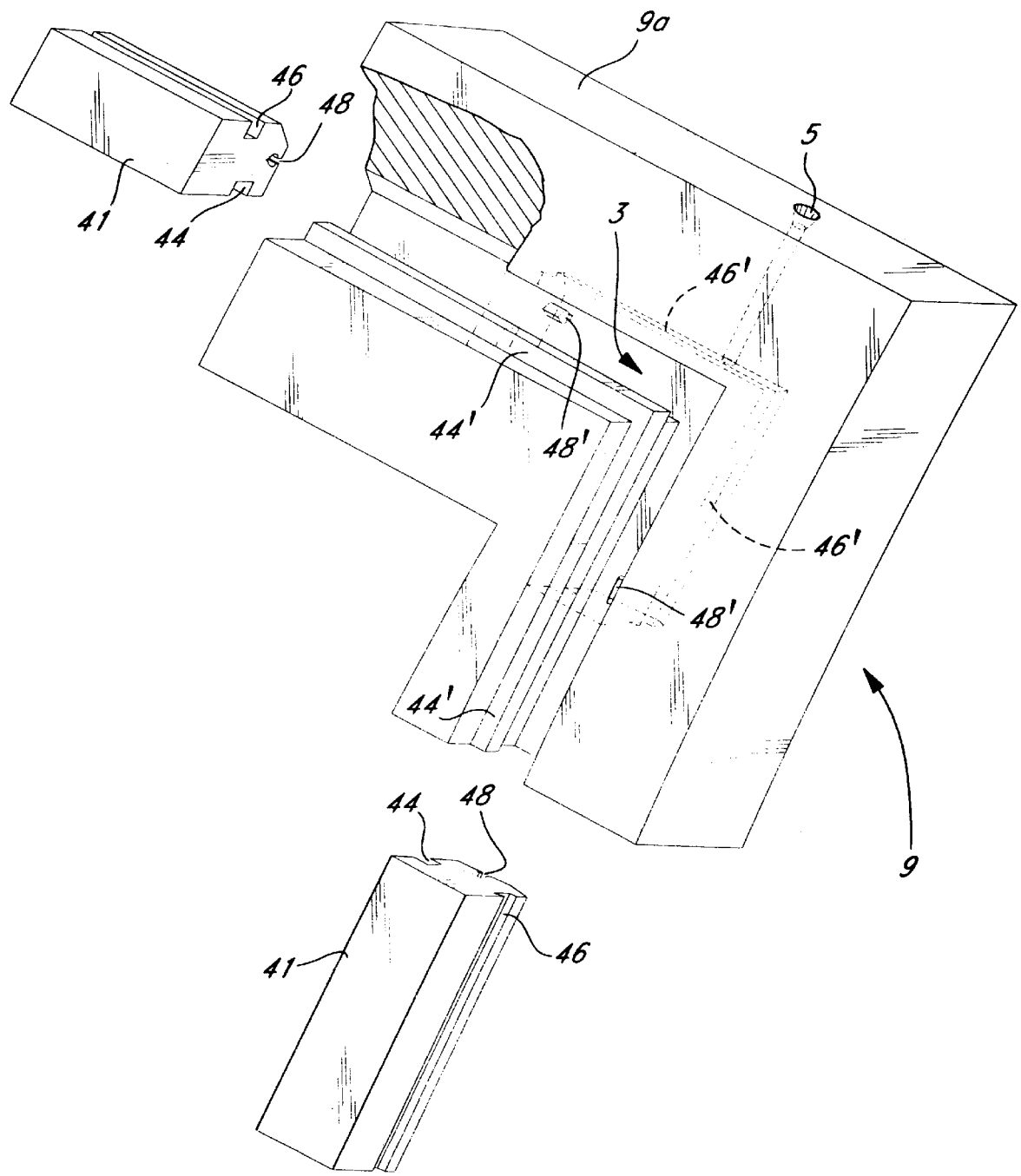
FIG. 15 is a perspective view showing the seal being formed in the mold.
Figures 15A, 15B:
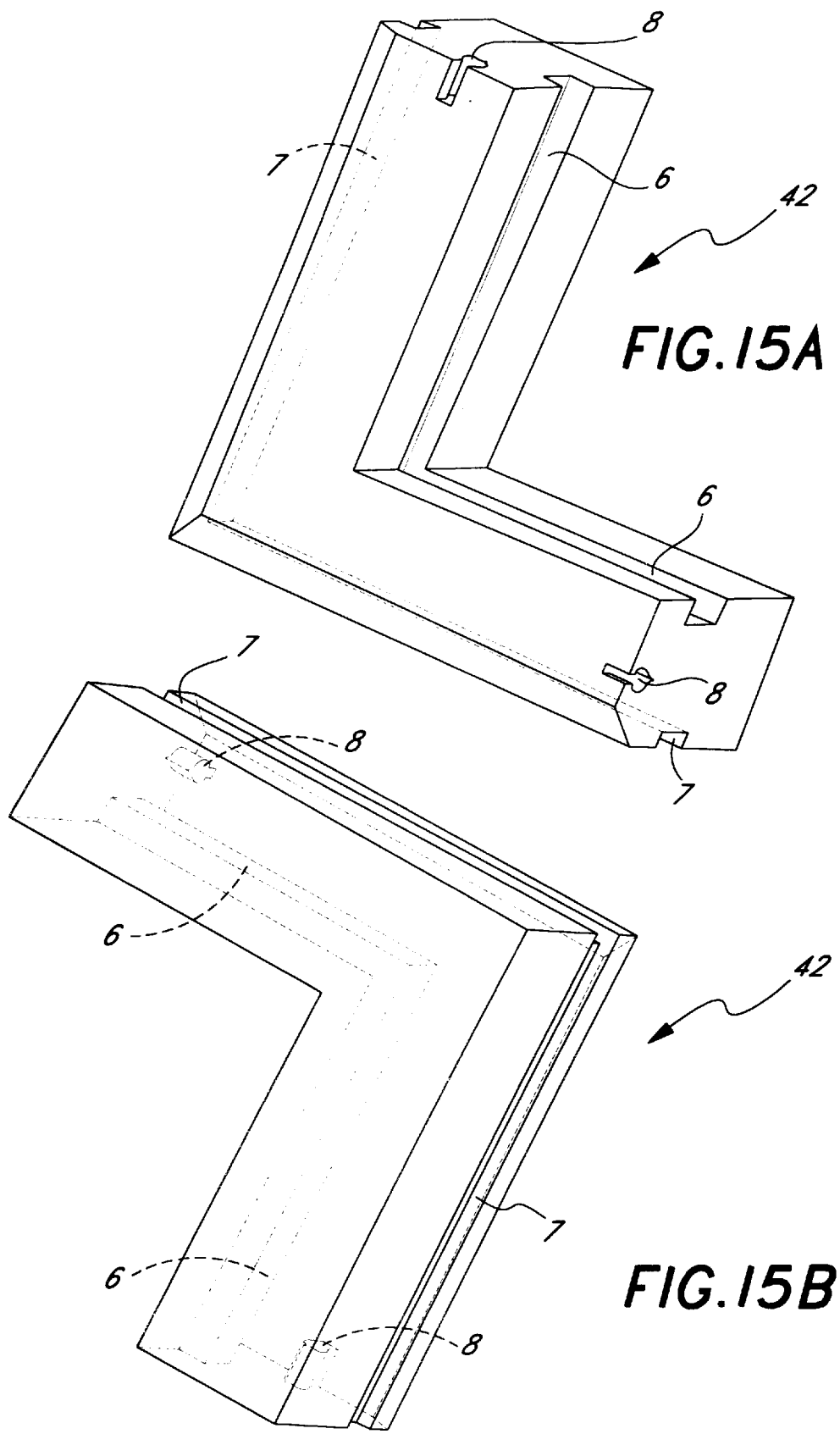
FIG. 15A is a perspective view of one side of the corner piece formed in the mold.
FIG. 15B is a perspective view of the other side of the corner piece formed in the mold.

As best depicted in FIGS. 14 and 15, each corner piece 42 has a pair of adjacent legs 41 molded to it during a conventional insertion molding process. Preformed legs 41 are placed between two members 9a (only one shown) of an insert mold 9. There are raised elements 44', 46' and 48' in the one member 9a corresponding to the grooves 44, 46 and 48 in the legs. The element 48' is short and only extends a short way, for example ¼ inch, into a partially formed internal cavity 3 in the member 9a. The other elements 44' and 46' extend around the entire internal side surfaces of the cavity 3. Upon closing the two members 9a of the insert mold 9, a complete cavity (not shown) is created which is filled through the inlet 5 with molten material that solidifies on cooling to form a corner piece 42 which is bonded securely to the preformed legs 41 inserted into the mold 9. Since the elements 44' and 46' extend along the entire inside surfaces of the mold 9, grooves 6 and 7 (FIGS. 15A and 15B) are provided in the corner piece 42 formed during molding which will receive edges of the window pane 34 or edges of the frame 33, as the case may be. Because the element 48' only partially extends into the cavity 3, an indentation in the form of a short spade shaped groove 8 is provided in the corner piece which will receive a free end of the locking strip 50. Consequently, as best shown in FIGS. 15A and 15B, each corner piece 42 has an inner groove 6 and an outer groove 7 along the inner and outer walls, respectively, for receiving the window pane 34 and frame 33, respectively. There is, however, only a short spade shaped groove 8 in the ends of each corner piece 42. Only the free, terminal end of the locking strip 50 fits into these short spade shaped grooves 8 when mounting the window pane 34 to the side 30 of the limousine 10a.

In attaching the seal 40 to the window pane 34 and window frame 33, a cord-like member 70 is placed within the groove 46. The window pane 34 is placed in the groove 44 and then the appropriate edge (edges 30a, 36a, or edge 38a as the case may be) of the frame 33 is manually pushed into the groove 46 while simultaneously pulling the cord-like member 70 from the groove 46. This procedure is illustrated in FIGS. 5B through 5E in connection with the edge 36a of the roof wall structure 37. As best shown in FIG. 5B, the frame side 40d of the seal 40 is first pushed between the reveal molding 52 and the edge 36a, with the leg 52b of the reveal molding being spring biased outwardly. As illustrated in FIG. 5C, as the seal 40 is pushed into the space between the leg 52b and the edge 36a, the cord-like member 70 is pulled inwardly from the groove 46, forcing the biased corner 40a of the seal 40 to bend outwardly. This facilitates opening the mouth of the groove 46 so that the edge 36a, as shown in FIG. 5D, slips into the groove 46 simultaneously with pulling the cord-like member 70 from this groove. Finally, the locking strip 50 is inserted into the spade shaped groove 48 to expand the seal 40, so that it fits snug against the window pane and edge 36a, with the reveal molding 52 now returned to its normal position.

Figure 2D:
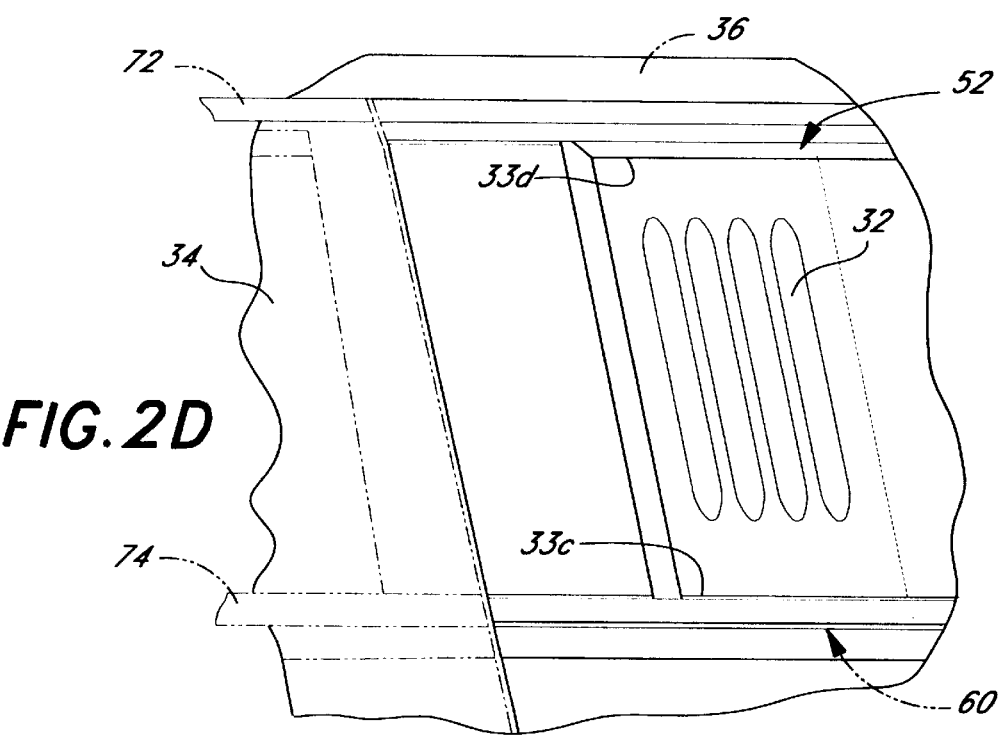
FIG. 2D is an enlarged fragmentary view of the rear window section taken along line 2D of FIG. 2B.
Figure 3B:
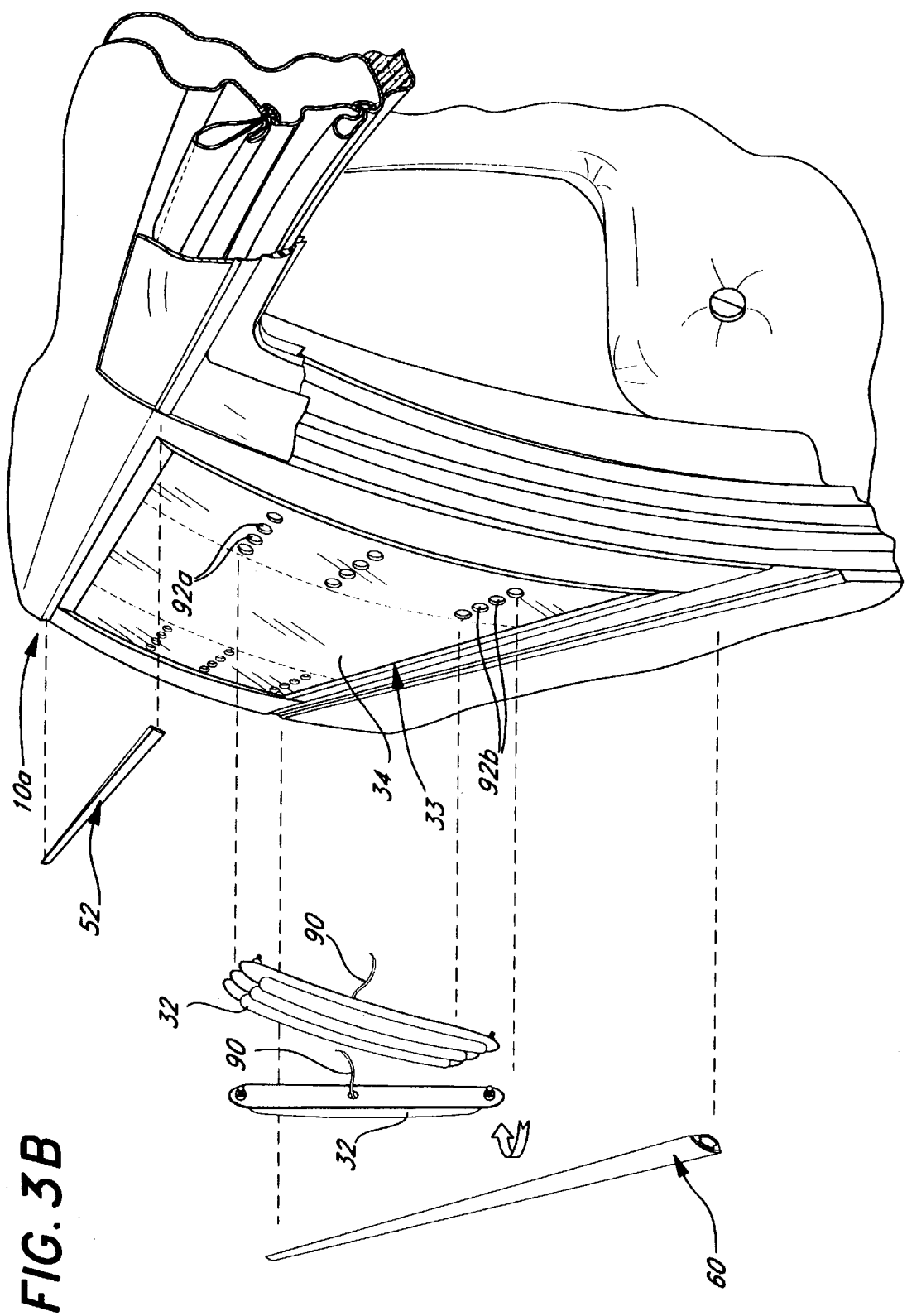
FIG. 3B is a perspective view similar to that shown in FIG. 3A, with the lamps and reveal and belt molding exploded away from the side of the limousine.
Figure 3C:
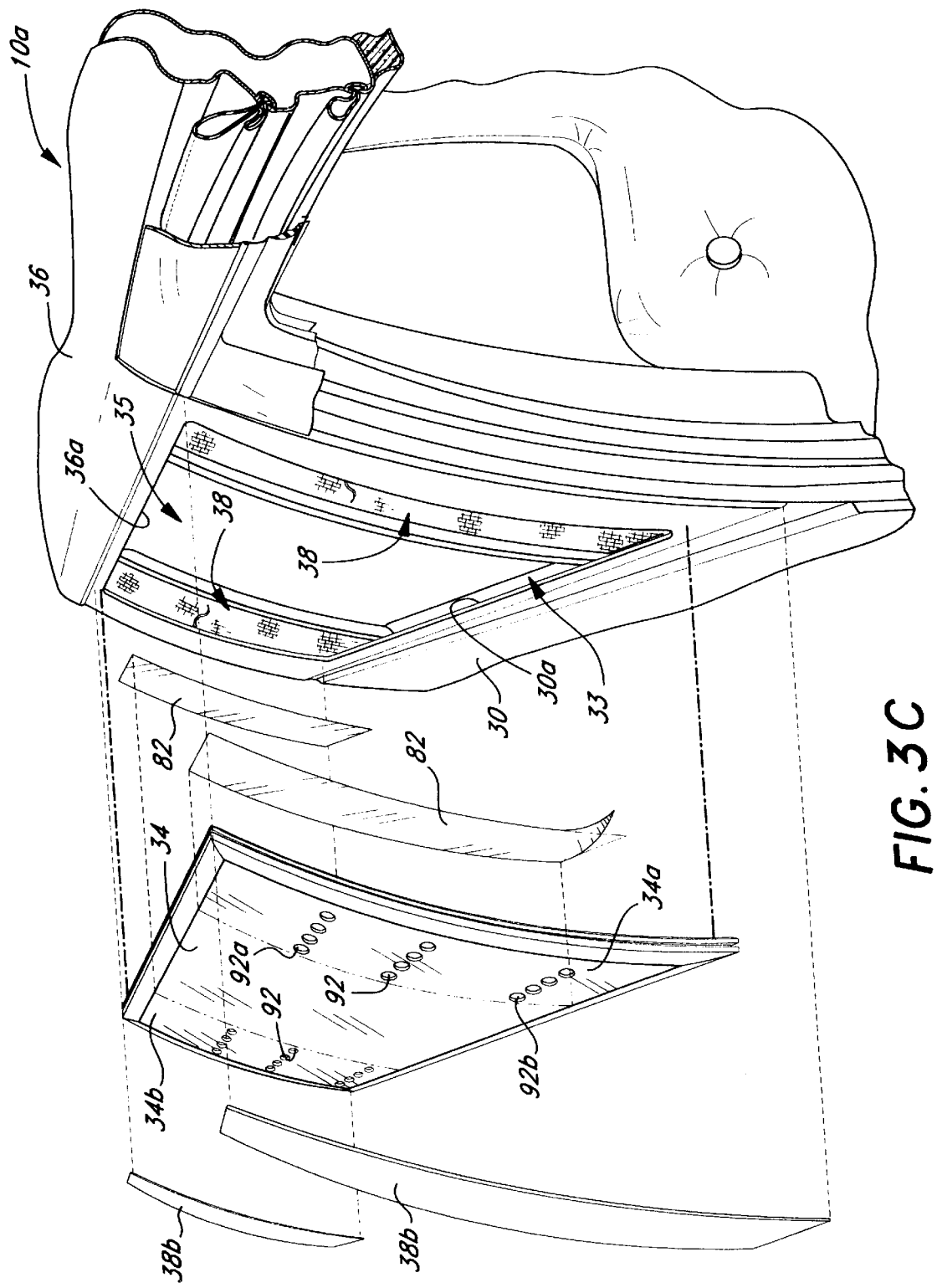
FIG. 3C is a perspective view similar to that shown in FIG. 3B, with the window pane exploded away from its frame and side opening.

As best illustrated in FIGS. 2C and 2D, the reveal molding 52 above the installed window pane 34 is aligned with a reveal molding 72 along the upper portion of adjacent forward and rear doors 20, and the belt molding 60 below the installed window pane 34 is aligned with a belt molding 74 along the intermediate portion of adjacent forward and rear doors 20. This arrangement not only assists in proper mounting of the window pane 34 in the side 30 of the limousine 10a, but also enhances the appearance of the limousine, because the reveal and belt molding in the doors 20 and in the side 30 are in alignment. Usually, the reveal molding 52 and the reveal molding 72 each have a chrome surface and are of the same width so that they each have an exterior substantially similar in appearance. Similarly, the belt molding 60 and the belt molding 74 each have a chrome surface and are of the same width so that they each have an exterior substantially similar in appearance.

In accordance with another feature of this invention, the lamps 32 are attached directly to the window pane 34. Although only one lamp 32 may be used, it is preferable to use two or more lamps which are positioned side by side. In the embodiment shown in FIGS. 8A and 8B, fasteners 80 for mounting the lamps 32 to the window pane 34 are attached from the inside of the passenger compartment 10b. In the embodiment shown in FIGS. 9A and 9B, fasteners 100 for mounting the lamps 32 to the window pane 34 are attached from the outside of the passenger compartment 10b. These lamps 32 are positioned opposite end portions of the side sail panel structures 38 which overlap the ends of the opening 35 in which the window pane 34 is seated.

Figure 13:
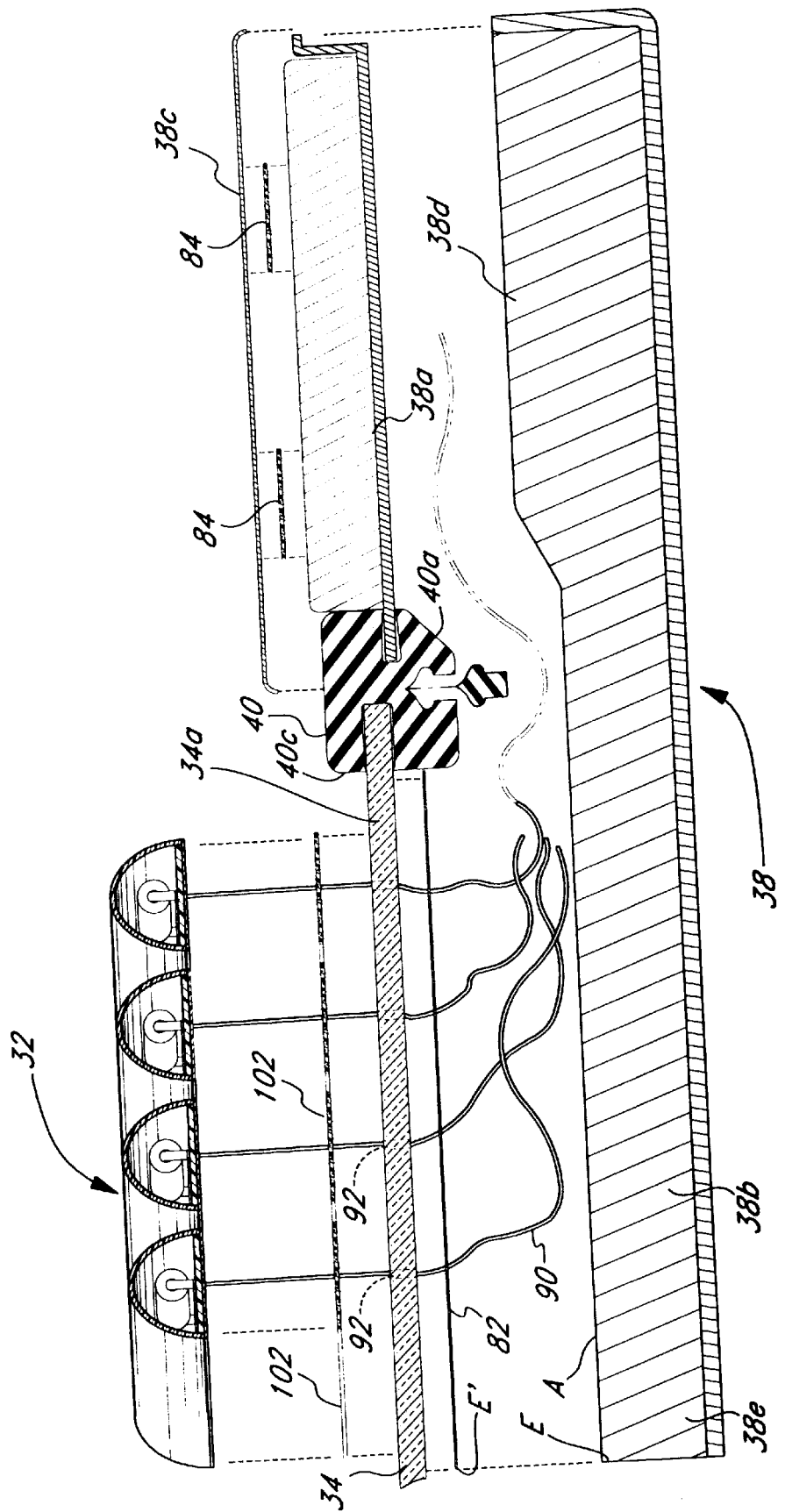
FIG. 13 is a cross-sectional view taken along line 13—13 of FIG. 4.

As best shown in FIGS. 3C and 13, each side sail panel structure 38 includes a body member 38a, an internal upholstered section 38b between the body member 38a and the inside of the passenger compartment 10b, and a cover 38c which is attached by two sided adhesive tape 84 to the exterior of the body member 38a. Each end 38e of each internal upholstered section 38b overlaps with an opposed end portion 34a or 34b of the window pane 34. A sheet 82 of tinted material which is essentially opaque, at least when viewed from outside the limousine 10a, is used to hide the wires 90 and other electrical connectors for the lamps 32. Each sheet 82 is disposed between the surface area A of each internal upholstered section 38b and the inside of the window pane 34, so upon assembly each overlapping portion of the internal upholstered section 38b is covered with the sheet 82 with the edges E of each end 38e of each internal upholstered section 38b being coincident with and terminating with the edge E' of each opaque sheet 82. This prevents someone looking through the window pane 34 from the outside the limousine 10a from seeing through the window pane 34 the upholstered section 38b or any wires 90 or other electrical connectors for the lamps 32.

There are wire holes 92 in the window pane 34 which allow the wires 90 for the lamps 32 to extend through the window pane and be connected to the electrical system of the limousine 10a. In the embodiment shown in FIGS. 8A and 8B and FIGS. 9A and 9B, there are pairs of holes 92a and 92b respectively above and below the wire holes 92. These holes 92a and 92b are used for attaching the fasteners 80 or 100 as the case may be to the lamps 32. As illustrated in FIGS. 8A and 8B and FIGS. 9A and 9B, each lamp 32 has a base 32a with a lens 32b fitted over the base so that the lens is force fitted or snaps into position. The base 32a has holes 92a' and 92b' in it which are in alignment respectively with the holes 92a and 92b in the window pane 34 when the lamp 32 is mounted to the window pane 34. Upon assembly, a gasket 102 is disposed between the base 32a and the exterior surface of the window pane 34, with the openings 102a and 102b respectively aligned with the holes 92a' and 92b' in the base and holes 92a and 92b in the window pane. In each hole carrying a fastener 80 or 100, there is inserted into the hole a grommet 104 which surrounds the fastener.

Figure 9B:
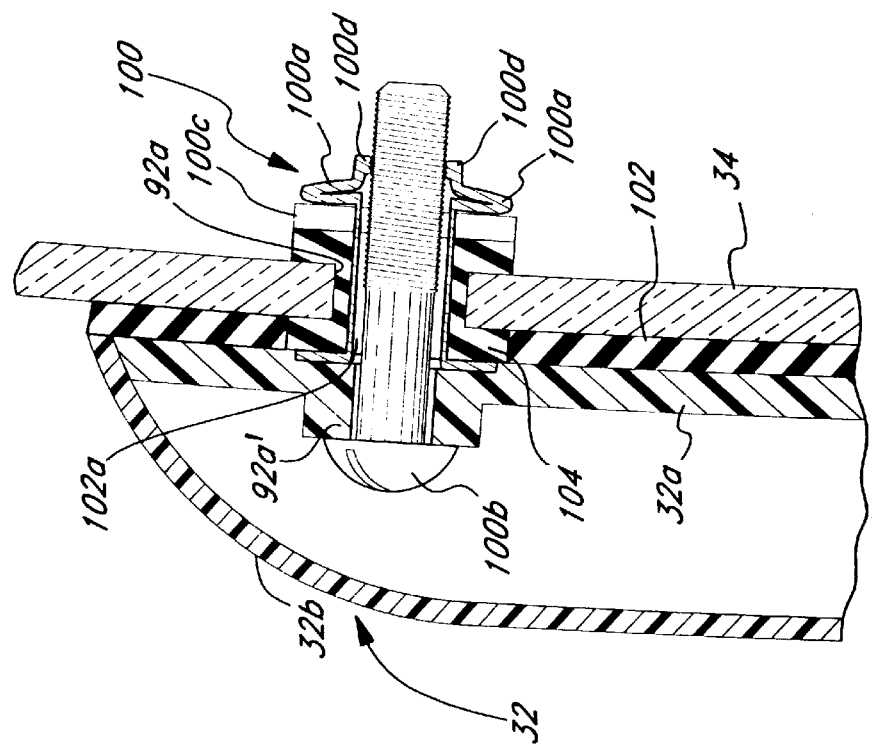
FIG. 9B is an enlarged fragmentary view taken along line 9B of FIG. 9A.
Figure 8B:
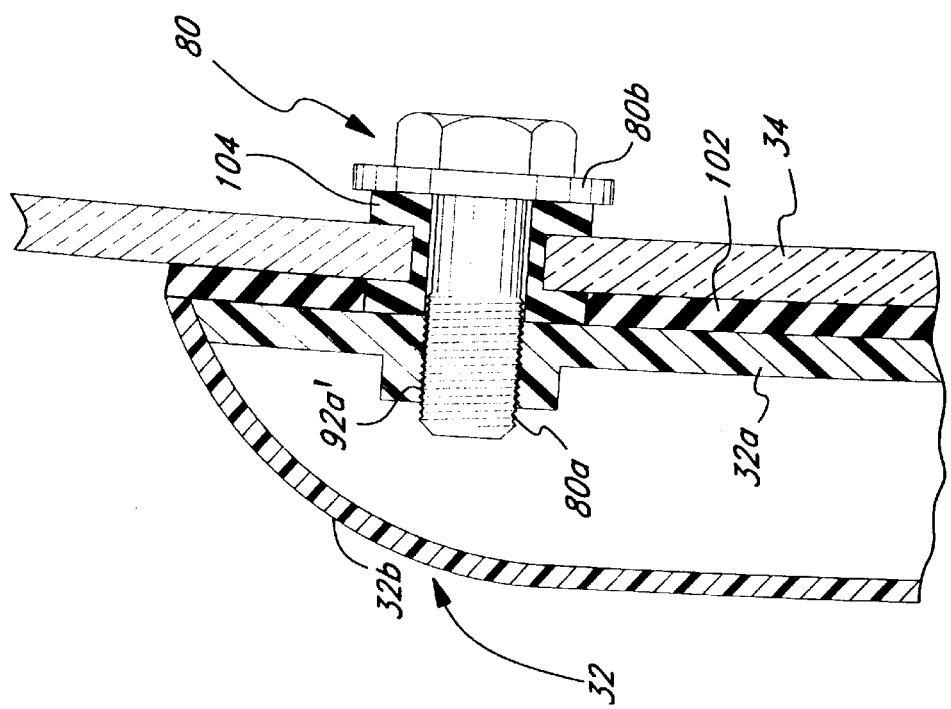
FIG. 8B is an enlarged fragmentary view taken along line 8B of FIG. 8A.

In the embodiment shown in FIGS. 8A and 8B, the fastener 80 is attached and detached from the inside of the passenger compartment 10b. The fastener 80 is a conventional bolt 80a with a washer 80b threaded into the hole 92a' which is threaded. In contrast, the embodiment shown in FIGS. 9A and 9B, the fastener 100 is attached and detached from the exterior of the limousine 10a after first removing the lens 32b. In the embodiment shown in FIGS. 9A and 9B, a conventional lock type fastener is employed, which includes a deformable shell 100a having a bolt 100b extending through a washer 100c into a threaded end 100d of the shell. Upon turning the bolt 100b, the deformable shell 100a collapses, as shown in FIG. 9B, to lock this shell in place, with the expanded threaded end 100d having the washer 100c disposed between it and the grommet 104. When the lens 32b is removed, the bolt 100b may be simply removed by unscrewing it to detach the base 32a and gasket 102. The washer 100c prevents the deformable shell 100a from expending excessively so that the lass window pane 34 does not crack.

As shown in FIGS. 10, 11 and 12, a third way for mounting a lamp 32 eliminates the need for the holes 92a and 92b in the window pane 34. In this embodiment, the lamp 32 employed has only one hole 110 in the base 32a. As shown the wires 90 extend through this hole 110 and only one hole 110a in a gasket 102a and are connected to a light emitting diode, incandescent bulb or other light source 112. The gasket 102a has a shape conforming to the shape of the underside of the lamp 32, with adhesives on both its sides that bond the internal surface S of the base 32a to the gasket and then bond the gasket to the exterior surface of the window pane 34.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A vehicle side including an elongated opening in the side which receives therein a window pane seated in the opening, said elongated opening having opposed ends with an internal panel adjacent at least one end and positioned so that a portion of the panel overlies the opening, an essentially opaque material disposed between at least an end portion of an interior surface portion of the window pane and the portion of the panel overlying the opening, and at least one lamp attached to the window pane on an exterior surface portion of the window pane opposite the panel.

2. The vehicle side of claim 1 where there are at least two spaced apart holes in the window pane in the portion of the window pane opposite the panel, and a fastener extending through each of the holes and connected to said at least one lamp to secure the lamp to the window pane, and a grommet member positioned within each of the holes and surrounding each of the fasteners.

3. The vehicle side of claim 1 where there is a gasket disposed between an underside of said at least one lamp and the exterior surface portion of the window pane, said gasket having one side which is bonded by an adhesive to the underside of the lamp and another side which is bonded by an adhesive to the exterior surface portion of the window pane.

4. The vehicle side of claim 1 where said at least one lamp comprises a lens detachably mounted to a base which is secured to the exterior surface portion of the window pane by a fastener which is accessed upon detaching the lens to allow the fastener to be disconnected for removal of the lamp from the window pane.

5. The vehicle side of claim 1 where the window pane has edges defining a substantially rhomboid configuration and the elongated opening has a shape substantially the same as the window pane with a perimeter having a seal along essentially the entire perimeter, said seal having a slot therein which receives the edges of the window pane.

6. The vehicle side of claim 1 including a lower body side wall positioned below the window pane, said window pane having sealed edges with a window molding strip along the sealed edge of the window adjacent the lower body side wall.

7. The vehicle side of claim 6 having along side the window pane a door with a substantially horizontal door molding strip along an intermediate exterior portion of the door, said window molding strip along the sealed edge of the window pane being horizontally aligned with the door molding strip.

8. The vehicle side of claim 7 where the window molding strip along the sealed edge of the window pane and the door molding strip each have an exterior substantially similar in appearance.

9. The vehicle side of claim 1 including a top wall positioned above the window pane, said window pane having sealed edges with a window molding strip along the sealed edge of the window adjacent the top wall.

10. The vehicle side of claim 9 having along side the window pane a door with a substantially horizontal door molding strip along an upper exterior portion of the door, said window molding strip along the sealed edge of the window pane being horizontally aligned with the door molding strip and having an exterior substantially similar in appearance to the appearance of the door molding strip.

11. A vehicle side including an elongated opening in the side which receives therein a window pane, an elongated window pane seated in the opening, said window pane having an exterior surface, and at least one lamp attached directly to the window pane on the exterior surface of the window pane.

12. The vehicle side of claim 11 where there are at least two spaced apart holes in the window pane in the portion of the window pane opposite the panel, and a fastener extending through each of the holes and connected to said at least one lamp to secure the lamp to the window pane, and a seal member positioned within each of the holes and surrounding each of the fasteners.

13. The vehicle side of claim 11 where there is a gasket disposed between an underside of the lamp and the exterior surface portion of the window pane, said gasket having one side which is bonded by an adhesive to the underside of the lamp and another side which is bonded by an adhesive to the exterior surface portion of the window pane.

14. The vehicle side of claim 11 where said at least one lamp comprises a lens detachably mounted to a base which is secured to the exterior surface portion of the window pane by a fastener which is accessed upon detaching the lens to allow the fastener to be disconnected for removal of the lamp from the window pane.

15. A vehicle side including a window frame having an elongated opening which receives therein a window pane, said elongated opening having opposed ends with an internal panel adjacent at least one end and positioned so that a portion of the panel overlies the opening, an elongated window pane seated in the opening, said window pane having an interior surface with an opaque material disposed between the portion of the panel overlying the opening and the interior surface, at least one lamp detachably mounted to the window pane on an exterior surface portion of the window pane opposite the panel, and an elongated, flexible, resilient seal surrounding the window pane seated in the opening, said seal having a body with a substantially rectangular cross-sectional configuration, an inside surface, an outside surface, a frame surface, and a window pane surface, a locking groove along the inside surface of the body which receives a locking strip that is inserted into the locking groove, a frame groove along the frame surface which receives an edge of a portion of the window frame, a window pane groove along the window pane surface which receives an edge of a portion the window pane, and a biased corner between the frame surface and the inside surface which is at an angle of from 30 to 60 degrees with respect to the inside surface.

16. The vehicle side of claim 15 where the frame defines a corner of the opening which forms an angle having two legs corresponding to adjacent sides of the opening and the seal comprises two leg segments and a corner piece which fits within the angle of the corner with the leg segments being attached to the corner piece during an insert molding process, so that each leg segment is aligned with one leg of the angle.

* * * * *